United States Patent [19]
Brusasco

[11] Patent Number: 4,944,555
[45] Date of Patent: Jul. 31, 1990

[54] VEHICLE POWER SEAT

[75] Inventor: Enzo Brusasco, Torino, Italy

[73] Assignee: R.G.B. S.p.A., Italy

[21] Appl. No.: 223,542

[22] Filed: Jul. 22, 1988

[30] Foreign Application Priority Data

Jul. 29, 1987 [IT] Italy ............................ 53564/87 [U]

[51] Int. Cl.$^5$ ............................................... A47C 1/02
[52] U.S. Cl. .................................... 297/330; 297/347
[58] Field of Search ............... 297/330, 329, 344, 345, 297/346, 347, 348, 361; 248/393, 419, 420, 429, 430, 395

[56] References Cited

U.S. PATENT DOCUMENTS

| | | | |
|---|---|---|---|
| 2,025,436 | 12/1935 | Brosset | 297/344 X |
| 2,827,105 | 3/1958 | Brundage | 297/330 X |
| 2,864,431 | 12/1958 | Eaton | 297/347 X |
| 2,875,809 | 3/1959 | Ragspace et al. | 297/330 X |
| 3,338,632 | 8/1967 | Kleinsorge | 297/330 |
| 3,355,211 | 11/1967 | Kolle | 297/346 X |
| 4,309,015 | 1/1982 | Muhr | 297/330 X |
| 4,691,964 | 9/1987 | Morgan | 297/330 |
| 4,759,587 | 7/1988 | Bucka | 297/361 |

Primary Examiner—Jose V. Chen
Attorney, Agent, or Firm—Eckert, Seamans, Cherin & Mellott

[57] ABSTRACT

A vehicle power seat, wherein the seat portion presents a carriage having a center cavity for a spring cushion, and hinged at the rear to a reclinable backrest. The carriage is mounted in axially-sliding manner on two substantially horizontal lateral guides located on opposite sides of the center cavity, and supported on a slide traveling along two fixed inclined lateral guides. Backrest rotation in relation to the carriage, axial slide of the carriage along the horizontal lateral guides, and slide travel along the inclined lateral guides, are each controlled by a pair of electric linear actuators on opposite sides of the carriage center cavity.

7 Claims, 4 Drawing Sheets

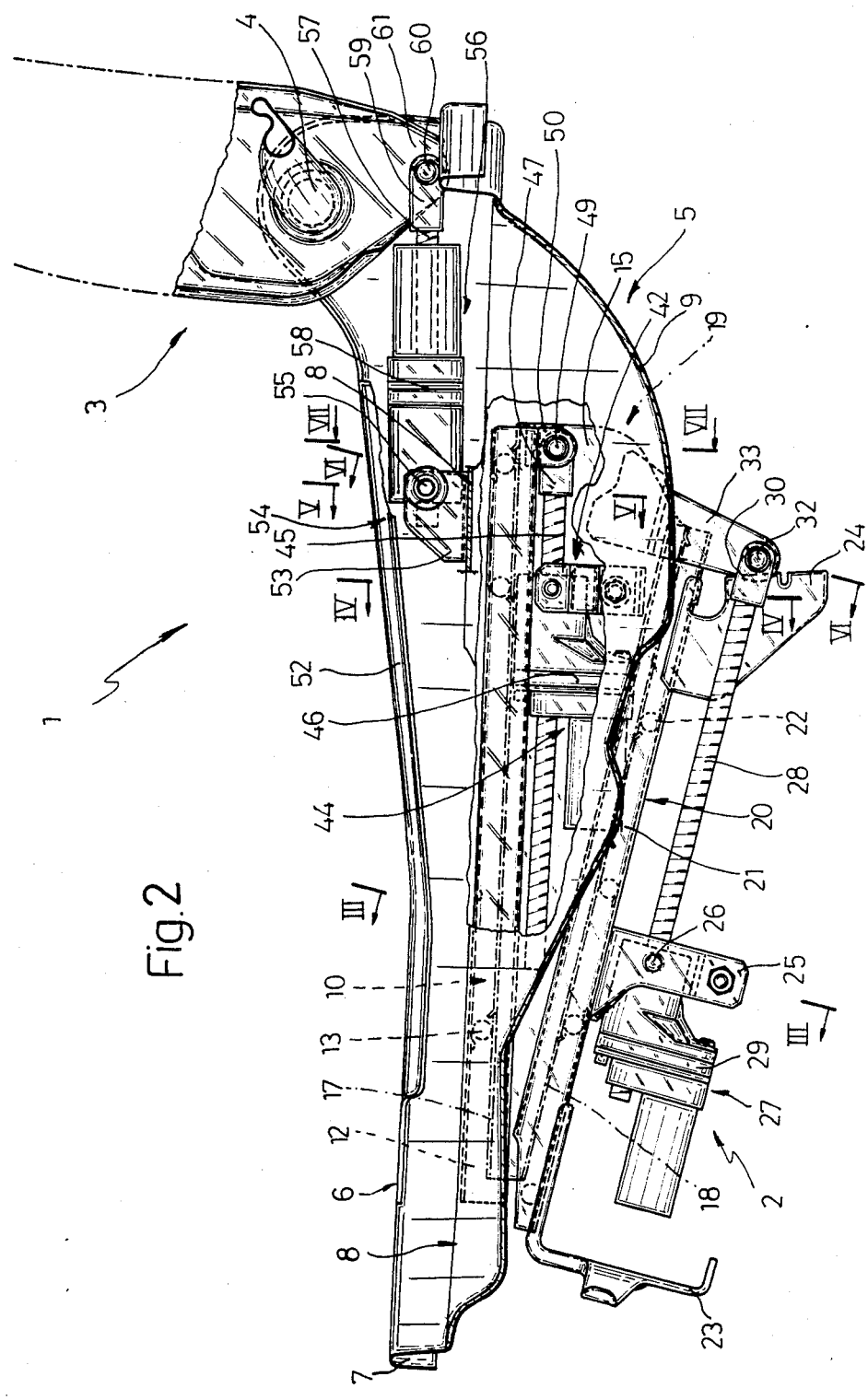

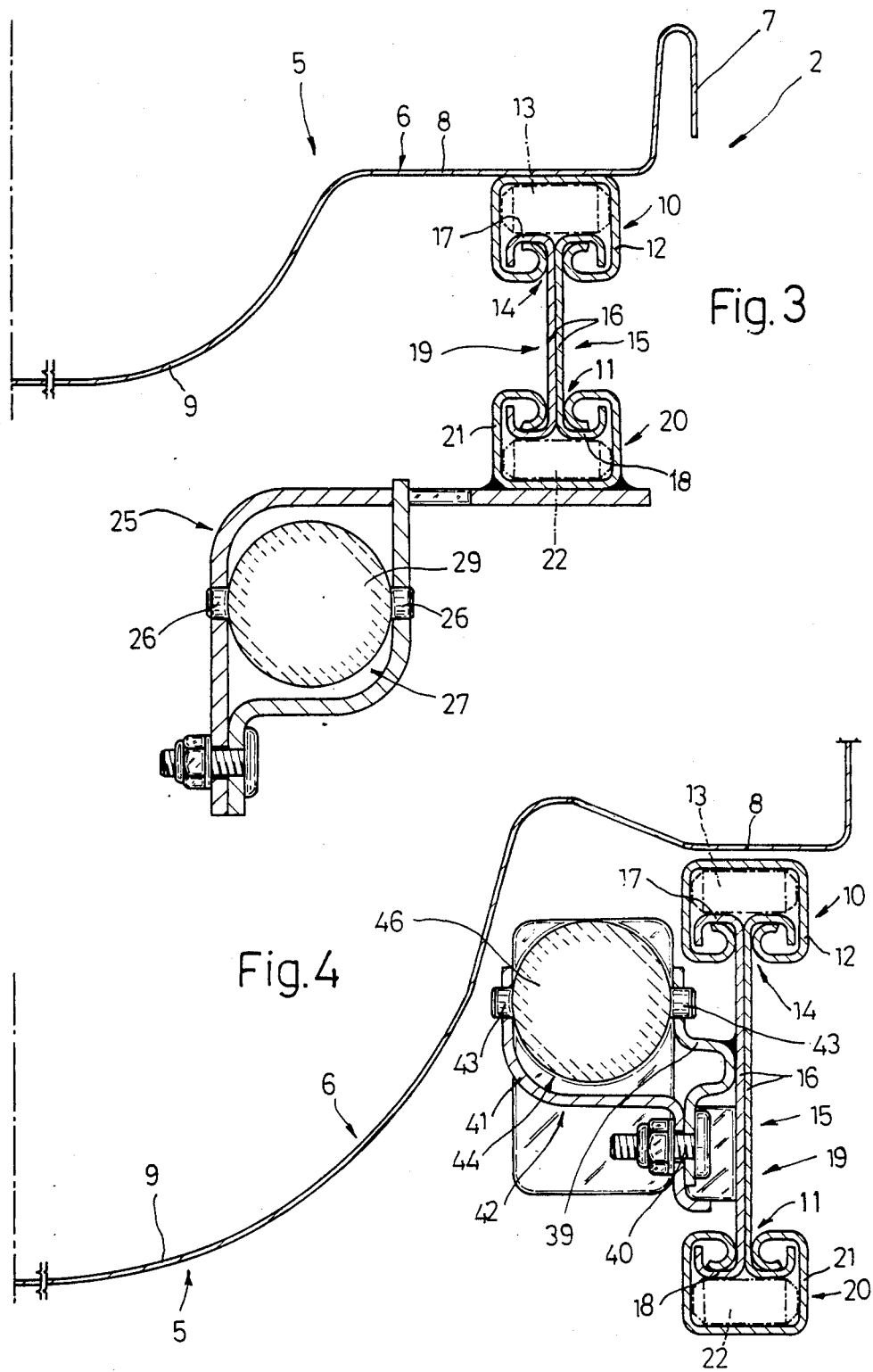

VEHICLE POWER SEAT

BACKGROUND OF THE INVENTION

The present invention relates to a vehicle power seat, particularly for road vehicles.

Road vehicles are known to be fitted with adjustable seats comprising a seat portion consisting of a carriage hinged at the rear to a reclinable backrest, and mounted on two substantially horizontal lateral guides in such a manner as to slide axially in relation to the vehicle.

The said guides are normally supported on a slide located beneath the seat portion and mounted so as to travel along a further two bottom lateral guides secured to the vehicle floor and sloping upwards towards the front of the vehicle.

On known seats of the aforementioned type, the height of the carriage in relation to the vehicle floor is adjusted by moving the said slide, together with the said carriage, back and forth along the inclined bottom guides; the position of the carriage along the vehicle axis by moving the carriage along the horizontal guides; and the backrest angle in relation to the seat portion by rotating the backrest about the axis of the hinge connecting it to the carriage.

On known seats of the aforementioned type, both carriage movements are usually controlled by means of two rack-and-pinion couplings controlled by respective electric motors located either centrally in relation to the said guides and underneath the carriage, or outside the said guides. In the latter case, to prevent jamming of the carriage or slide along the furthermost guides from the motors, both the carriage and slide present complex drive and/or strengthening members extending underneath the carriage.

Regardless of location, the said motors are invariably cumbersome, and cannot be employed on seat portions featuring bucket type cushions, the springing of which requires the formation of a center cavity on the carriage; which cavity rules out any possibility of using either centrally-located motors underneath the carriage, or centrally-located drive and/or strengthening members in the case of laterally-located motors.

Consequently, known power seats of the aforementioned type all present relatively high-section cushions, due to the need for employing flat-based carriages, whereas bucket cushions are employed exclusively on manually-adjusted seats. What is more, in addition to being cumbersome, the motors employed on known power seats are invariably expensive, and difficult to assemble and service.

SUMMARY OF THE INVENTION

The aim of the present invention is to provide a vehicle power seat designed to overcome the aforementioned drawbacks.

With this aim in view, according to the present invention, there is provided a vehicle power seat comprising a reclinable backrest and a front seat portion; said seat portion comprising a carriage having a center cavity and connected at the rear to the said backrest so as to enable rotation of the same, in relation to the said carriage, about a transverse hinge axis; two fixed longitudinal guides extending perpendicularly to the said hinge axis, sloping upwards towards the front of the said seat portion, and located on opposite sides of the said cavity; a slide mounted in sliding manner on the said fixed guides; two substantially horizontal longitudinal guides located over the said slide and connected in sliding manner to the same, the said two horizontal guides supporting the said carriage so as to travel, together with the same, along the said slide, and being located on opposite sides of the said cavity; and drive means for moving the said carriage in relation to the said slide, and the said slide in relation to the said fixed guides, and rotating the said backrest in relation to the said carriage; characterised by the fact that, for each said movement, the said drive means comprise a pair of linear actuators located on opposite sides of the said center cavity on the said carriage.

BRIEF DESCRIPTION OF THE DRAWINGS

A non-limiting embodiment of the present invention will be described by way of example with reference to the accompanying drawings, in which:

FIG. 2 shows a partial longitudinal section, with parts removed for simplicity, of the FIG. 1 seat;

FIG. 3 shows a section along line III—III in FIG. 2;
FIG. 4 shows a section along line IV—IV in FIG. 2.

DETAILED DESCRIPTION OF THE INVENTION

Figure 1:
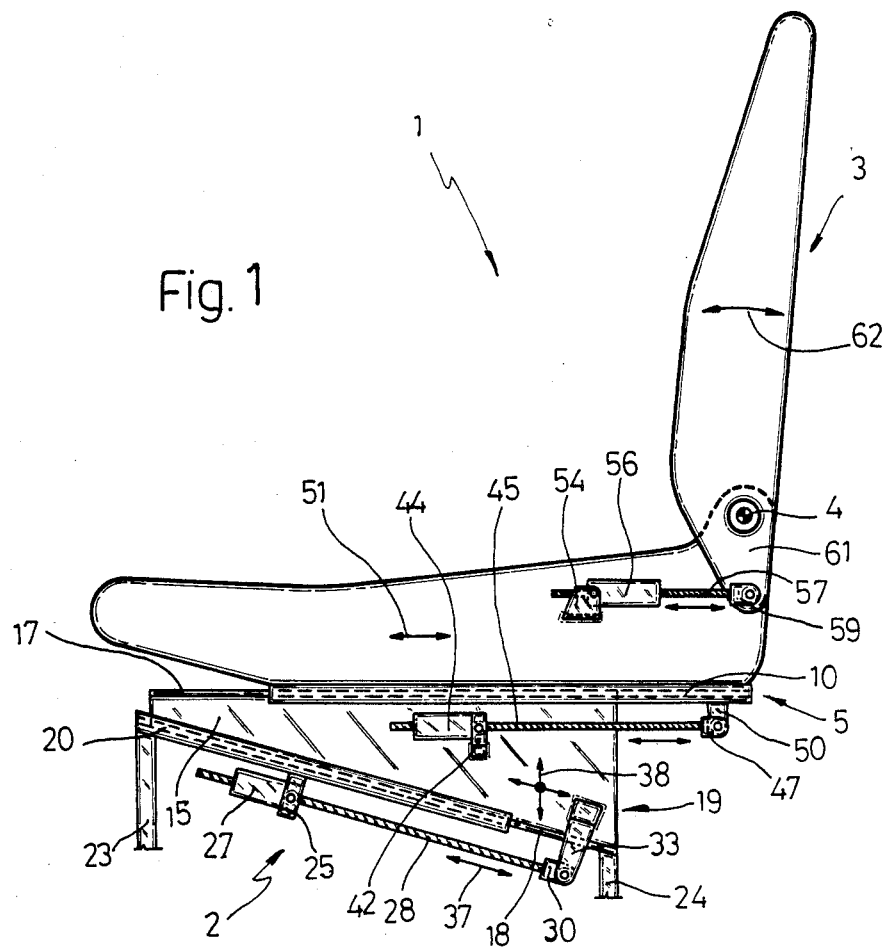
FIG. 1 shows a schematic side view of a preferred embodiment of the seat according to the present invention.

Number 1 in FIG. 1 indicates a seat comprising a front seat portion 2, and a backrest 3 connected to a rear portion of seat portion 2 via a horizontal transverse hinge 4.

As shown, particularly in FIG. 2, seat portion 2 comprises a carriage 5 defined by a plate 6 preferably formed from sheet metal and shaped so as to define, as shown by the half cross section in FIG. 3, two downturned longitudinal outer edges 7; two longitudinal supporting surfaces 8 adjacent to and inside respective downturned edges 7; and a center cavity 9 having its concave side facing upwards, and blending with the said surfaces 8. Cavity 9 provides an unobstructed concave shell (as shown in FIG. 2) designed to house a spring system (not shown) for a bucket seat (not shown) placed over and integral with carriage 5.

As shown in FIGS. 3 to 7, beneath each of the surfaces 8, plate 6 is connected to a substantially horizontal roller guide 10 comprising a tubular metal section 12 of substantially rectangular cross section, housing a number of rollers 13 and having a longitudinal gap 14 along its bottom face.

Each gap 14 is engaged in sliding manner by a flat, substantially vertical plate 15 shaped, in elevation, substantially in the form of a triangle and, in cross section, substantially in the form of a double "T".

Plate 15 consists of two integral superimposed triangular metal sheets 16, the top and bottom edges of which are turned outwards in opposite directions so as to form two flat wings 17 and 18. Top wing 17, arranged substantially horizontally, is housed inside respective section 12 and connected in sliding manner to rollers 13.

Plates 15 (only one of which is shown) are located on opposite sides of cavity 9, and combine to form a slide 19 traveling along two fixed longitudinal roller guides 20.

As shown in FIGS. 2, 3, 4 and 6, each of guides 20 (only one of which is shown) slopes upwards and frontwards of seat 1, and comprises a tubular metal section 21 of substantially rectangular section housing a number of rollers 22 and having, on its upper face, a longitudinal gap 11 engaged in sliding manner by the bottom portion of respective plate 15. Bottom wing 18 of each plate 15 extends parallel with respective guide 20 inside section 21 of the same, and rests in sliding manner on rollers 22.

As shown in FIGS. 1 and 2, the bottom face of each guide 20 is fitted with a front and rear bracket 23 and 24 for assembling guide 20 to the vehicle floor (not shown), and a fork-shaped intermediate bracket 25 supporting, in oscillating manner via two pins 26, an electric linear actuator 27 of the type described and illustrated in Industrial Utility Patent Application n. 53 558-B/87 filed by the present Applicant on July 24, 1989 and to which full reference is made herein.

Figure 6:
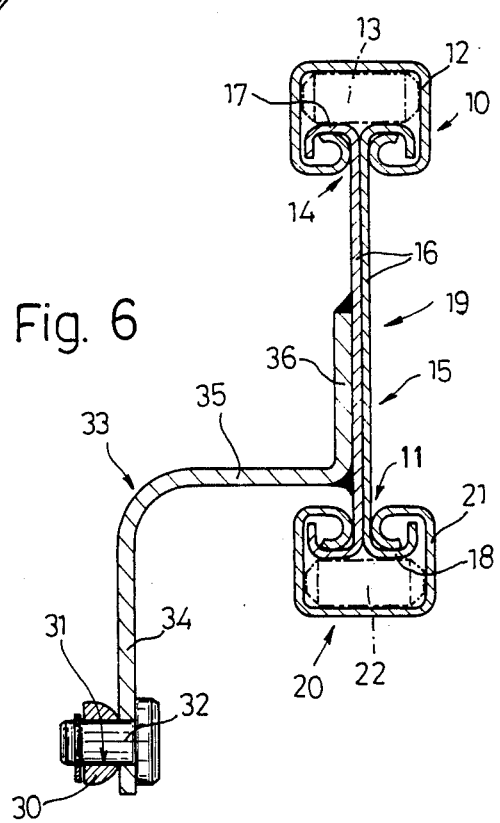
FIG. 6 shows a section along line VI—VI in FIG. 2.

According to the above patent application, actuator 27 comprises an output member consisting of a screw 28 powered by an electric geared motor 29 via a recirculating-ball screw-nut screw coupling (not shown). Screw 28 extends beneath and inboard of respective guide 20 towards rear bracket 24, and is fitted on its free end with a head 30 having, as shown in FIG. 6, a through transverse hole 31 engage in rotary manner by a pin 32. Pin 32 is connected integral with the bottom end of a substantially S-shaped bracket 33 comprising a substantially vertical bottom portion 34, a substantially horizontal intermediate portion 35, and a substantially vertical top portion 36 welded to the inner surface of inner sheet 16 of respective plate 15. Operation of the said two actuators 27 therefore provides for moving slide 19 along guides 20 in the direction of arrows 37 (FIG. 1), thereby moving guides 10 vertically in the direction of arrows 38, due to slide 19 riding along the upward slope of guide 20.

Figure 7:
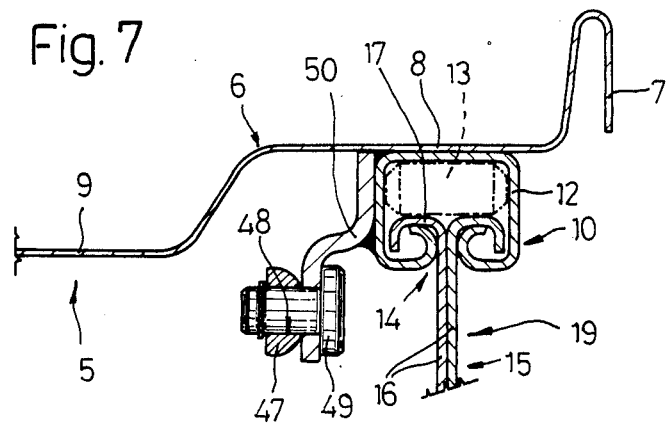
FIG. 7 shows a section along line VII—VII in FIG. 2.

The inner surface of inner sheet 16 of each plate 15 is welded to a bracket 39 fitted, in removable manner via bolt 40, with a second bracket 41 defining, together with bracket 40, a fork 42 for supporting, in oscillating manner via two transverse pins 43, a further electric linear actuator 44 substantially identical to actuator 27 and comprising an output member consisting of a screw 45 powered by an electric geared motor 46 via a recirculating-ball screw-nut, screw coupling (not shown). Screw 45 extends beneath and inboard of respective guide 10 towards rear bracket 24, and is fitted on its free end with a head 47 having, as shown in FIG. 7, a through transverse hole 48 engaged in rotary manner by a pin 49. Pin 49 is connected integral with the bottom end of a bracket 50 welded to the inner side wall of respective guide 10 and close to the rear end of the same.

Operation of the said two actuators 44 therefore provides for moving carriage 5 along slide 19 in the direction of arrows 51 (FIG. 1).

Figure 5:
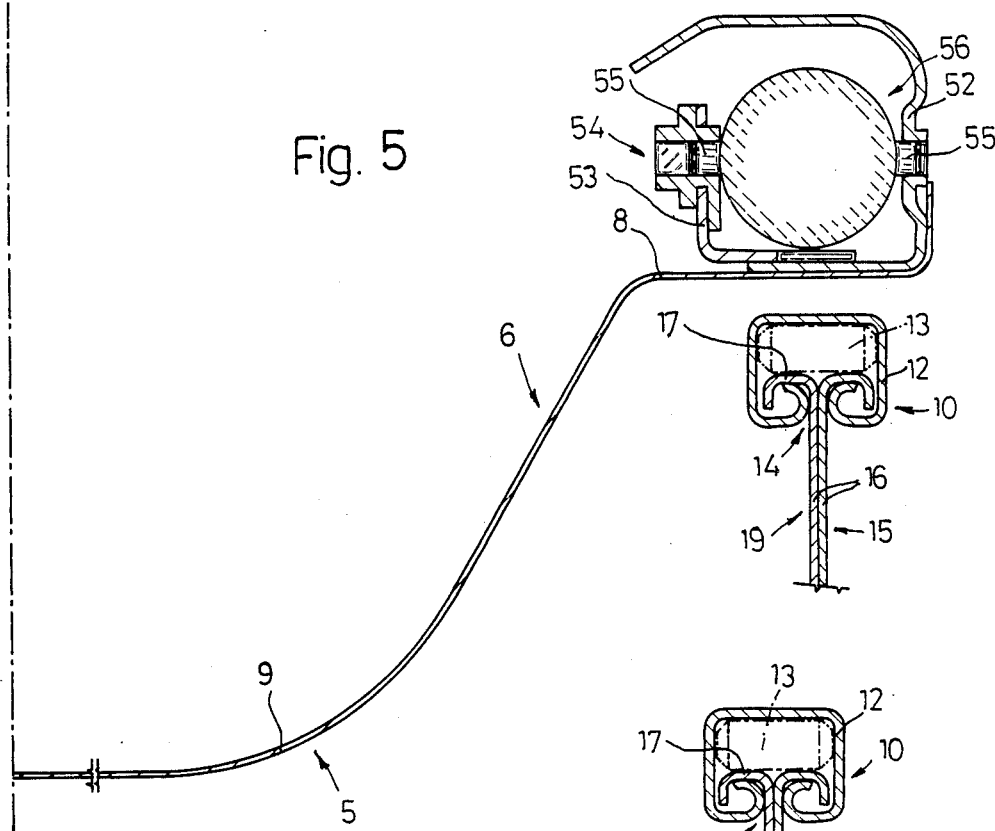
FIG. 5 shows a section along line V—V in FIG. 2.

As shown in FIGS. 2 and 5, over and close to the rear end of each surface 8, there are provided two brackets 52 and 53 integral with each other and with respective surface 8. Brackets 52 and 53 combine to define a substantially tubular body 54 arranged longitudinally and housing, in oscillating manner via two pins 55, a further electric linear actuator 56 substantially identical to actuator 27 and comprising an output member consisting of a screw 57 powered by an electric geared motor 58 via a recirculating-ball screw-nut screw coupling (not shown). Screw 57 extends rearwards, over and along respective surface 8, and is fitted on its free end with a head 59 connected, as shown in FIG. 2, to a through screw 60 for connection to the bottom end of a respective appendix 61 extending from the bottom end of backrest 3 beneath hinge 4.

Operation of the said two actuators 56 therefore provides for rotating backrest 3 in relation to carriage 5 about the axis of hinge 4 in the direction of arrows 62 (FIG. 1).

The advantages of employing pairs of actuators 27, 44 and 56 for respectively enabling vertical and longitudinal displacement of carriage 5, and rotation of backrest 3 in relation to the same, will be clear from the following description.

Firstly, by virtue of employing a pair of linear actuators for each of the said movements, the said actuators may be assembled on opposite sides of cavity 9 regardless of the depth or size of the same.

Secondly, by virtue of operating in pairs, the said actuators may be relatively small and thus housed easily in the aforementioned positions.

Finally, employing a pair of actuators for controlling vertical and horizontal displacement of carriage 5 eliminates any possibility of jamming along pairs of guides 10 and 20. Owing to the inevitable difference in the slide resistance of guide pairs 10 or 20, the actuator adjacent to the guide presenting the greater resistance absorbs a large part of the load, thus entraining the other, which only exerts thrust when the sliding component controlled by it tends to jam along the respective guide.

I claim:

1. A vehicle power seat comprising:
   a reclinable backrest and a front seat portion, said seat portion comprising a carriage having an unobstructed center cavity and connected at the rear to said backrest so as to enable rotation of the same, in relation to said carriage, about a transverse hinge axis;
   two fixed longitudinal guides extending perpendicularly to the hinge axis, sloping upwards towards the front of said seat portion, and located on opposite sides of said cavity;
   a slide mounted in sliding manner on said fixed guides;
   two substantially horizontal longitudinal guides located over the slide and connected in sliding manner to the same, said two horizontal guides supporting the carriage so as to travel, together with the same, along the slide, and being located on opposite sides of said cavity;
   a first drive means rigidly fixed with respect to the carriage and connected to rotate the backrest relative to the carriage;
   a second drive means rigidly fixed with respect to the slide and connected to move the carriage relative to the slide;
   a third drive means rigidly fixed with respect to the fixed guides and connected to move the slide relative to the fixed guides;
   and wherein said first, second and third drive means comprise a pair of linear actuators located on opposite sides of said center cavity of the carriage.

2. The seat according to claim 1, wherein each said actuator is electric.

3. The seat according to claim 1, wherein said carriage comprises a plate shaped so as to form said center cavity and two longitudinal supporting surfaces on opposite sides of said center cavity; each of the two horizontal guides being secured beneath a respective said supporting surface.

4. The seat according to claim 3, wherein the backrest presents two lateral appendices extending beneath said hinge axis; rotation of the backrest in relation to said carriage and about said hinge axis being controlled by a first pair of said actuators; each actuator in said first pair being mounted over a respective said supporting surface, and connected, at one end, to said supporting surface and, at the other end, to a respective said appendix on the backrest.

5. The seat according to claim 1, wherein said slide comprises two substantially triangular plates arranged substantially vertically on opposite sides of the center cavity; top and bottom edges of each said triangular plate being connected respectively and in sliding manner to a respective said horizontal guide and a respective said fixed guide.

6. The seat according to claim 5, wherein displacement of the carriage in relation to the slide is controlled by a second pair of said actuators; each actuator in said second pair being mounted inboard of a respective triangular plate on said slide, and connected, at one end, to said triangular plate and, at the other end, to a respective said horizontal guide.

7. The seat according to claim 5, wherein displacement of the slide along the fixed guides is controlled by a third pair of said actuators; each actuator in said third pair being mounted beneath a respective said fixed guide and connected, at one end, to said fixed guide and, at the other end, to a respective triangular plate on the slide.

* * * * *